US011388222B2

(12) United States Patent
Li et al.

(10) Patent No.: US 11,388,222 B2
(45) Date of Patent: Jul. 12, 2022

(54) MOBILE EDGE COMPUTING

(71) Applicant: Verizon Patent and Licensing Inc., Arlington, VA (US)

(72) Inventors: Feng Li, Lexington, MA (US); Jae Won Chung, Lexington, MA (US); Vikram Siwach, Carlisle, MA (US); Praveen Atreya, Jersey City, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 501 days.

(21) Appl. No.: 15/971,803

(22) Filed: May 4, 2018

(65) Prior Publication Data
US 2019/0342373 A1 Nov. 7, 2019

(51) Int. Cl.
*H04L 67/10* (2022.01)
*H04L 47/24* (2022.01)
*H04L 12/66* (2006.01)
*H04L 9/40* (2022.01)

(52) U.S. Cl.
CPC ............ *H04L 67/10* (2013.01); *H04L 12/66* (2013.01); *H04L 47/24* (2013.01); *H04L 63/10* (2013.01)

(58) Field of Classification Search
CPC ......... H04L 67/10; H04L 67/28; H04L 47/24; H04L 24/66; H04L 63/10
See application file for complete search history.

(56) References Cited

U.S. PATENT DOCUMENTS

| | | | | |
|---|---|---|---|---|
| 10,250,512 B2* | 4/2019 | Sidde | ...................... | H04L 67/42 |
| 10,628,135 B2* | 4/2020 | Sharma | ..................... | G06F 8/40 |
| 10,887,198 B2* | 1/2021 | Giust | ................... | H04L 41/5054 |
| 2003/0005028 A1* | 1/2003 | Dritschler | ............. | G06F 9/5061 |
| | | | | 718/104 |
| 2011/0200045 A1* | 8/2011 | Baehre | ................ | H04L 12/4633 |
| | | | | 370/392 |
| 2014/0075004 A1* | 3/2014 | Van Dusen | ........ | G06Q 30/0201 |
| | | | | 709/223 |
| 2014/0226661 A1* | 8/2014 | Mekkattuparamban | ..................... | |
| | | | | H04L 45/74 |
| | | | | 370/392 |

(Continued)

OTHER PUBLICATIONS

Unix & Linux Stack Exchange, "What is difference between user space and kernel space?", Aug. 21, 2013 (Year: 2013).*

(Continued)

*Primary Examiner* — Ninos Donabed

(57) ABSTRACT

A wireless network device can receive, at a traffic director in a kernel space, a data packet from a client device and determine whether the data packet is intended for an application cloud server operating in a cloud environment. The wireless network device can provide, based on determining that the data packet is intended for the application cloud server, the data packet to an application server instance executing on the wireless network device. The application server instance can be implemented in a virtualized software container in a user space, and can be configured to perform one or more operations associated with the application cloud server. The wireless network device can receive, at the traffic director and from the application server instance, a result of the application server instance performing the one or more operations on the data packet, and transmit the result to the application cloud server.

20 Claims, 9 Drawing Sheets

(56) References Cited

U.S. PATENT DOCUMENTS

| | | | |
|---|---|---|---|
| 2015/0382196 A1* | 12/2015 | Hillier | H04W 4/80 |
| | | | 726/7 |
| 2016/0226795 A1* | 8/2016 | Zhang | H04L 69/321 |
| 2016/0359697 A1* | 12/2016 | Scheib | H04L 43/16 |
| 2016/0379486 A1* | 12/2016 | Taylor | G08G 1/08 |
| | | | 340/905 |
| 2017/0060574 A1* | 3/2017 | Malladi | G06F 9/542 |
| 2017/0099228 A1* | 4/2017 | Hunsperger | G06F 9/545 |
| 2017/0264493 A1* | 9/2017 | Cencini | G06F 9/5083 |
| 2017/0277800 A1* | 9/2017 | Lucas | G06F 8/35 |
| 2018/0139274 A1* | 5/2018 | Gandhi | H04L 47/803 |
| 2018/0276039 A1* | 9/2018 | Boesen | G06F 9/4893 |
| 2018/0279091 A1* | 9/2018 | Boesen | H04W 12/06 |
| 2018/0279169 A1* | 9/2018 | Wang | H04L 1/20 |
| 2019/0014048 A1* | 1/2019 | Krishna Singuru | |
| | | | H04L 67/1097 |
| 2019/0042319 A1* | 2/2019 | Sood | G06F 9/45558 |
| 2019/0044854 A1* | 2/2019 | Yang | H04L 43/16 |
| 2019/0235906 A1* | 8/2019 | Asawa | G06F 9/4875 |

OTHER PUBLICATIONS

Agarwal Nitin, "Understanding the Docker Internals", Jan. 5, 2017 (Year: 2017).*

Oracle, "Sun Java System Application Server 9.1 Administration Guide;" 2010 (Year: 2010).*

\* cited by examiner

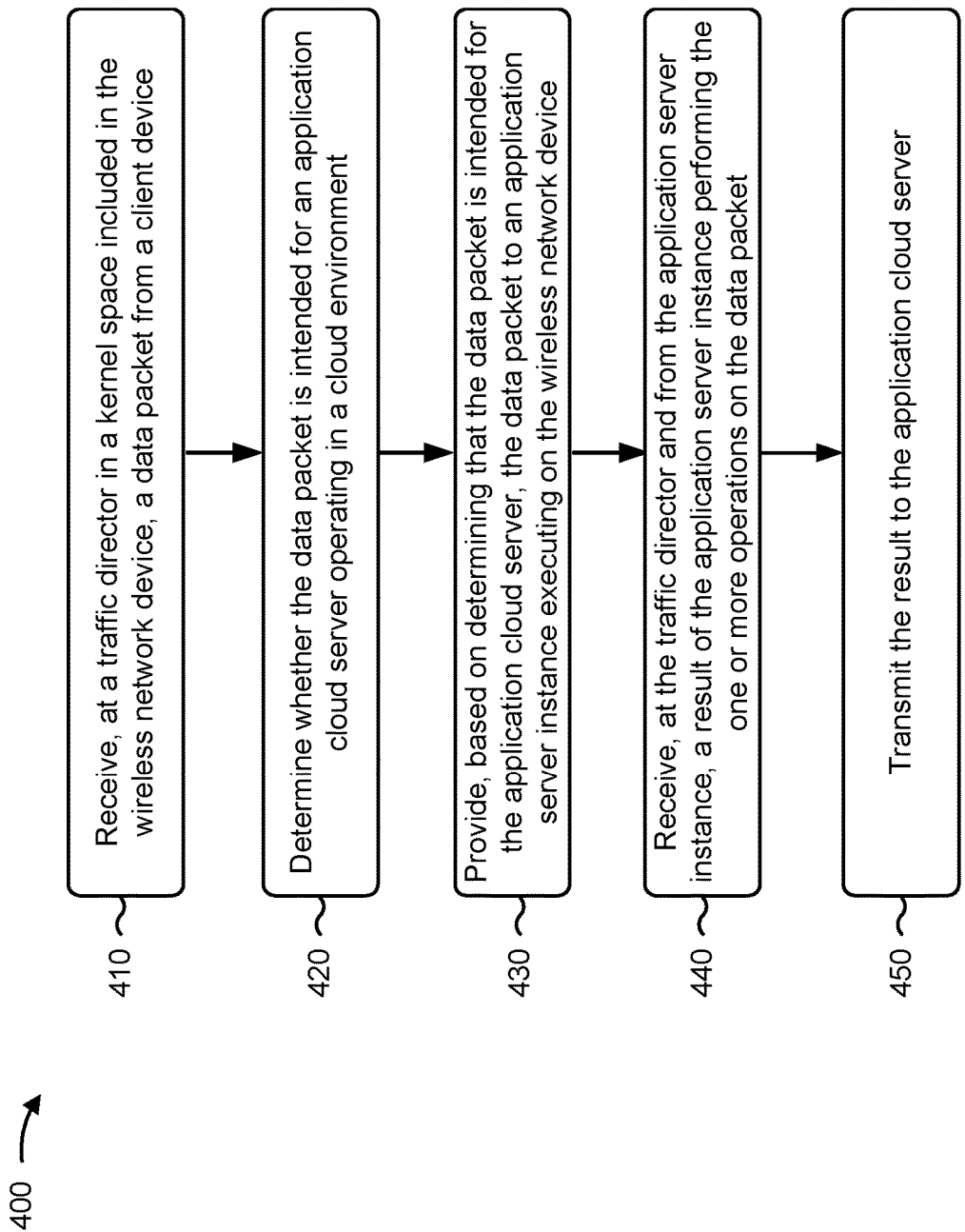

MOBILE EDGE COMPUTING

BACKGROUND

Edge computing is a method of optimizing cloud computing systems by performing data processing at the edge of the network, near the source of the data. This reduces the communications bandwidth needed by performing analytics and knowledge generation at or near the source of the data. Edge computing pushes applications, data and computing power away from centralized points to the logical extremes of a network, replicating fragments of information across distributed networks of web servers, which can spread over a vast area.

BRIEF DESCRIPTION OF THE DRAWINGS

FIG. 4 is a flow chart of an example process for mobile edge computing.

DETAILED DESCRIPTION OF PREFERRED EMBODIMENTS

Figure 1A:
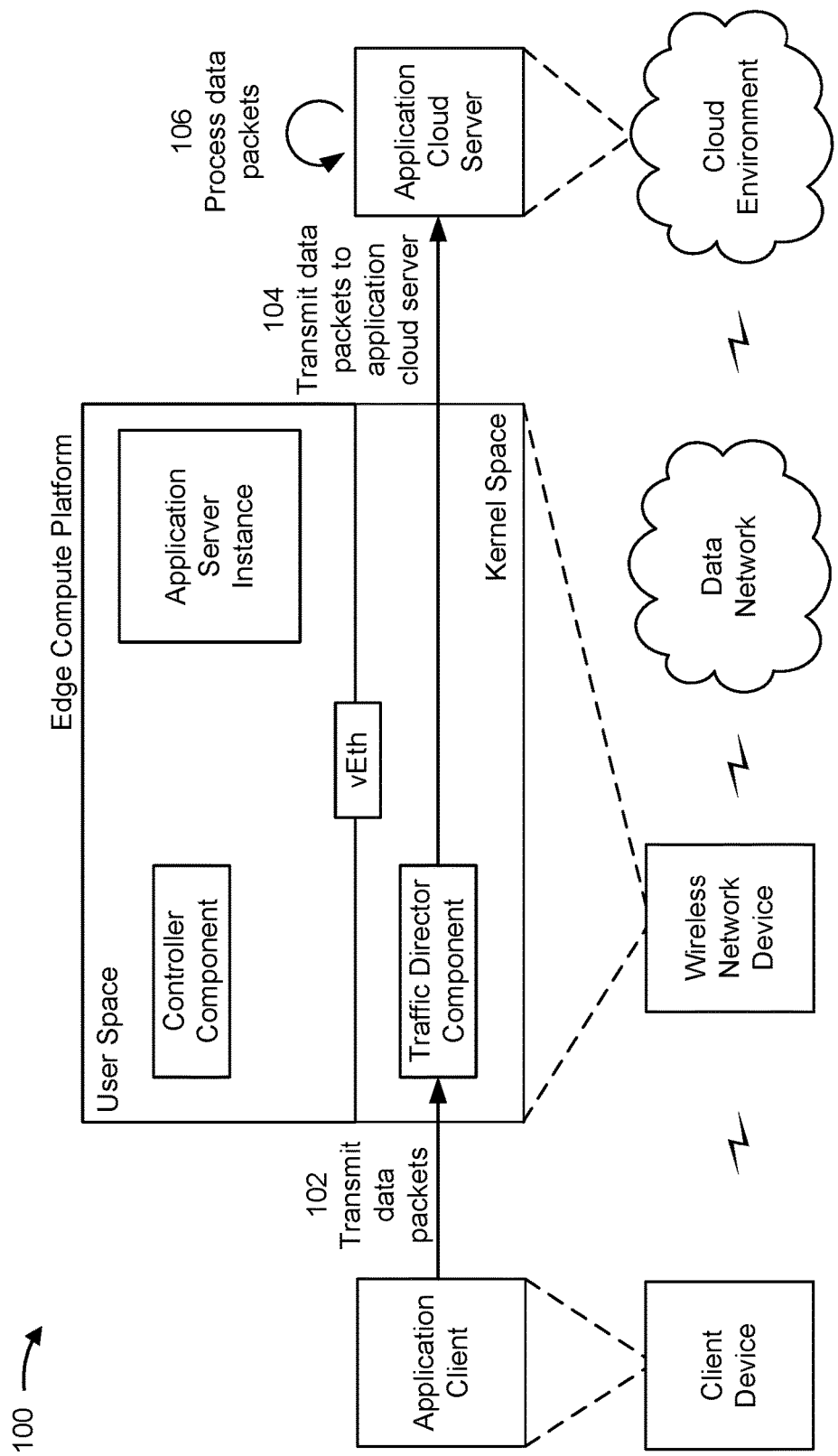
FIGS. 1A-1F are diagrams of an example implementation described herein.

The following detailed description of example implementations refers to the accompanying drawings. The same reference numbers in different drawings can identify the same or similar elements.

Some application clients on a client device can generate large amounts of data, and processing the data can be computationally intensive. The ability to process the data at the client device can be limited by the computational resources available on the client device. Moreover, performing such computationally intensive processing tasks at the client device can greatly increase energy consumption of the client device, which in turn can result in reduced battery life for the client device.

In some circumstances, processing of data generated by an application client on a client device can be offloaded onto an application cloud server (i.e., an application server operating in a cloud environment) associated with the application client. In this way, the application client on the client device generates the data, the client device transmits the data to the application cloud server via a data network such as the Internet, and the application cloud server processes the data. While offloading the processing of the data to the application cloud server conserves processing and battery resources on the client device, transmitting large amounts of data through the data network can increase latency because the data has to travel further (in terms of both time and distance) before the data is processed. As a result, offloading data to an application cloud server can be impractical for some types of applications, such as applications that rely on real-time data processing (e.g., applications that utilize processing of streaming video, applications that apply machine learning algorithms to streaming data, and/or the like).

In some cases, instead of having a client device offload data to an application cloud server, the data can be processed using a geographically distributed architecture referred to as a content delivery network (CDN). In the CDN, proxy servers can be geographically distributed across a data network, and the data can be offloaded to a proxy server closest to the client device through the data network. The proxy server closest (e.g., in terms of distance, time, etc.) to the client device can process the data and transmit a result of the processing to the application cloud server through the data network. In this way, the time and/or distance the data travels through the data network is minimized, which can minimize latency in processing the data. However, a CDN can involve introducing large amounts of proxy servers into a data network in order for a CDN to provide broad geographic coverage. As a result, the implementation of a CDN involves significant time provisioning hardware servers across a geographic area, as well as costs associated with operating and maintaining the CDN.

Some implementations described herein provide an edge compute platform that can be deployed in a wireless communications network without adding additional servers and/or other hardware to the wireless communications network. In this way, any device along a data path between a client device and an application cloud server can be converted into an edge compute platform. This allows for data to be processed at various points along a data path between a client device and an application cloud server without adding complexity and/or cost to the wireless communications network. Moreover, being able to implement the edge compute platform in any device along the data path between the client device and the application cloud server provides greater geographic availability of mobile edge computing resources compared to a CDN.

In some implementations, the edge compute platform can be deployed on a wireless network device in a wireless communications network. The edge compute platform can receive a data packet from a client device and determine whether the data packet is intended for an application cloud server operating in a cloud environment. The edge compute platform can provide, based on determining that the data packet is intended for the application cloud server, the data packet to an application server instance executing on the edge compute platform. In some implementations, the application server instance can be configured to perform one or more operations associated with the application cloud server. The edge compute platform can receive, from the application server instance, a result of the application server instance performing the one or more operations on the data packet, and can transmit the result to the application cloud server.

In this way, the edge compute platform can redirect data packets intended for the application cloud server to the application server instance so that the data packets can be processed at the edge of the wireless communications network. In this way, the result of the processing can be transmitted through the network of the wireless communications network instead of the data packets, which decreases latency associated with the processing and decreases bandwidth usage in the wireless telecommunications network. Moreover, this allows for the processing of the data packets to be offloaded from the client device, which reduces battery and computational resource usage on the client device. In addition, the edge compute platform can redirect the data packets without changing or reconfiguring the application client on the client device or the application cloud server, which simplifies deployment of mobile edge computing in the wireless communications network. Still further, unlike a CDN, which is typically accessible through a data network such as the Internet, the edge compute platform can be accessed without Internet access since the edge compute platform can be implemented in a wireless network device such as a base station, gateway, router, and/or the like.

FIGS. 1A-1F are diagrams of an example implementation 100 described herein. As shown in FIGS. 1A-1F, example implementation 100 can include a client device, a wireless network device, a data network, and a cloud environment.

In some implementations, the client device can include a wireless communication device, such as a smart phone, a desktop computer, a laptop computer, a tablet computer, user equipment (UE), an Internet of things (IoT) device, an internet protocol (IP) camera, an IP telephone (e.g., a telephone that communicates using voice over IP) and/or the like.

In some implementations, the client device can include an application client. For example, the client device can be associated with various types of applications, such as a license plate recognition application, an autonomous driving application, a video chat application, a facial recognition application, and/or the like. In some implementations, the client device can include a plurality of application clients, where each application client of the plurality of application clients is associated with a different application available on the client device.

In some implementations, the data network can include one or more packet data networks. For example, the network can include a wide area network (WAN) such as the Internet, a private data network, a local area network (LAN), an intranet, an operator services network, and/or the like.

In some implementations, the cloud environment can include an environment that hosts an application cloud server, and can provide computation, software, data access, storage, and/or other services. The application cloud server can host an application associated with the application client on the client device. In addition, the application cloud server can provide various services associated with the hosted application. For example, the application cloud server can provide authentication services (e.g., by having the application client provide login credentials to gain access to the application), security services (e.g., by encrypting and/or decrypting data packets transmitted between the application client and the application cloud server, by detecting malware, and/or the like), routing services (e.g., by determining how data packets associated with the application are routed through the network), storage services (e.g., by storing data packets associated with the application), processing services (e.g., by processing data packets received from the application client on the client device), and/or the like. In some implementations, the cloud environment can host a plurality of application cloud servers, each associated with a respective application.

In some implementations, the wireless network device can provide the client device with access to the data network (and by extension, the application cloud server in the cloud environment). In some implementations, the wireless network device can be included in a wireless communications network, such as a Wi-Fi network, a cellular network (e.g., a code division multiple access (CDMA) network, a 3G network, a 4G/LTE network, a 5G/NR network, another type of next generation network, etc.), a WiMAX network, and/or the like. In some implementations, the wireless network device can be included in a radio access network (RAN) at the edge of the wireless communications network, included in a core network of the wireless communications network, included in a backhaul between the RAN and the core network of the wireless communications network, and/or the like. In some implementations, the wireless network device can be included in the data network, such as at an edge of the data network.

In some implementations, the wireless network device can include various types of edge and/or core networking equipment, such as base stations, routers, switches, gateways, network bridges, hubs, wireless hotspots, and/or the like. In some implementations, the wireless network device can transmit data packets between the application client on the client device and the application cloud server in the cloud environment.

In some implementations, the wireless network device can include an edge compute platform. For example, the edge compute platform can be a platform capable of performing various functions, such as directing data packets received at the wireless network device, performing one or more operations on the received data packets, transmitting a result of the one or more operations to the application cloud server, and/or the like. In this way, the edge compute platform can redirect data packets intended for the application cloud server to the application server instance so that the data packets can be processed at the edge of the wireless communications network, thereby minimizing latency in the processing and minimizing the amount of data packets transmitted through the data network, which frees up resources in the data network (and the wireless communications network) to be used for other purposes.

In some implementations, the edge compute platform can be deployed in a wireless communications network without adding additional servers and/or other hardware to the wireless communications network. In this way, the edge compute platform can be included in any device along a data path between the client device and the application cloud server. This allows for data to be processed at various points along the data path between the client device and the application cloud server without adding complexity and/or cost to the wireless communications network, the data network, and/or the like. Moreover, being able to implement the edge compute platform in any device along the data path between the client device and the application cloud server provides broad geographic availability of mobile edge computing resources.

In some implementations, the edge compute platform can include a kernel space and a user space of an operating system (OS) (e.g., Linux, Unix, and/or the like) of the wireless network device. In this case, the kernel space and the user space can communicate through a virtual networking interface. The virtual networking interface can be a virtual Ethernet (e.g., a vEth) interface, and/or another type of networking interface implemented as a software component that permits communications between the kernel space and the user space.

In some implementations, the kernel space can be a portion of the OS reserved for running a kernel of the OS, running one or more kernel extensions (e.g., a program that adds to the functionality of the kernel), running one or more device drivers (e.g., a software interface that controls how various hardware components of the wireless network device operate), and/or the like. In some implementations, the kernel space can include a traffic director component. In this case, the traffic director component can use a traffic control kernel extension (e.g., Linux Traffic Control, Xtables, and/or the like) to direct data packets received at the wireless network device.

In some implementations, the user space can be a portion of the OS purposed for executing applications. In some implementations, the user space can include a controller component that can interact with the traffic director component in the kernel space. For example, the controller component can provide the traffic director component with traffic rules that define how the traffic director component directs data packets received at the wireless network device. A traffic rule can specify, for example, that data packets intended for a destination are to be transmitted to the intended destination, that data packets intended for a destination are to be transmitted to a different destination (i.e., redirected), and/or the like.

In some implementations, an application server instance can be included in the user space. In some implementations, the application server instance can be associated with the application cloud server in the cloud environment. For example, the application server instance can be a copy of the application cloud server or a portion of the application cloud server. In this way, the application server instance can be programmed to host the application associated with the application cloud server and the application client on the client device, and offer the same or similar services as the application cloud server (e.g., authentication services, security services, routing services, storage services, processing services, and/or the like, as described above). In some implementations, the controller component can assign an identifier to the application server instance, such as an IP address, port identifier, and/or the like.

In some implementations, the application server instance can be implemented in a virtualized software container (e.g., a Docker container, a Linux container (LXC), and/or the like) in the user space. In some implementations, a plurality of application server instances can be included in the user space. Each application server instance, of the plurality of application server instances, can be associated with a different application, and each application server instance, of the plurality of application server instances, can be implemented in a separate virtualized software container. In this case, a virtualized software container can be assigned a unique namespace (e.g., a Linux namespace) such as a process identifier. The namespace of each virtualized software container can be given isolated access to shared resources in the kernel space. In this way, the namespace function allows for the shared resources in the kernel space to be partitioned so that each virtualized software container is given access to a dedicated portion of the shared resources.

Turning now to FIG. 1A, in some implementations, a user of the client device can desire to use an application client on the client device. For example, the user can desire to use a license plate recognition application client on the client device to identify a license plate number of a vehicle. Accordingly, the user can interact with the client device (e.g., by using a touch screen or another input device) to launch the application client. As the user uses the application client (or at some time after the user has interacted with the application client), the application can generate application data. For example, the application data can include various types of data, such as video data, audio data, picture data, sensor data, location data, and/or the like. For example, if the user is using a license plate recognition application client, the user can be using the application client to capture a video stream or a video recording, and accordingly the application client can generate application data representing the video stream or recording.

In some implementations, the application client can generate the application data without interaction from the user. For example, the client device can be an IP camera installed in a parking garage, and the IP camera can be provisioned to continuously monitor an entrance gate of the parking lot for license plate numbers for security purposes. In this way, an application client on the IP camera can be configured to continuously capture a video stream without interaction from the user.

As shown in FIG. 1A, and by reference number 102, the client device can encode the application data into one or more data packets, assign the application cloud server as a destination for the one or more data packets, and transmit the one or more data packets toward the wireless network device. In this case, as shown, the wireless network device can receive, at the traffic director component in the kernel space, a data packet of the one or more data packets.

As further shown in FIG. 1A, and by reference number 104, the traffic director component can direct the data packet based on any traffic rules the traffic director component has been configured to apply. For example, the traffic director component can analyze the data packet to determine whether the data packet is intended for the application cloud server (e.g., by identifying a destination IP address in a header of the data packet, identifying a destination port in the header of the data packet, and/or the like). Based on determining that the data packet is intended for the application cloud server, the traffic director component can identify a traffic rule associated with directing data packets intended for the application cloud server. For example, the traffic director component can identify a traffic rule that specifies the data packets intended for the application cloud server are to be directed to the application cloud server. Accordingly, the traffic director component can transmit the data packet to the application cloud server based on the traffic rule.

In this case, the application cloud server can receive the data packet from the traffic director component of the wireless network device through the data network. The remaining data packets, of the one or more data packets, can be processed by the traffic data director and transmitted to the application cloud server in a similar fashion.

As further shown in FIG. 1A, and by reference number 106, the application cloud server can process the one or more data packets. Returning to the license plate recognition example described above, the one or more data packets received at the application cloud server can include the encoded application data (e.g., video stream or recording) generated by the license plate recognition application client. The application cloud server can process the one or more data packets by decoding the one or more data packets into the original application data and applying one or more object recognition techniques (e.g., template matching, pattern recognition, a machine learning model trained on license plate data, and/or the like) to identify license plate numbers in the application data.

Figure 1B:
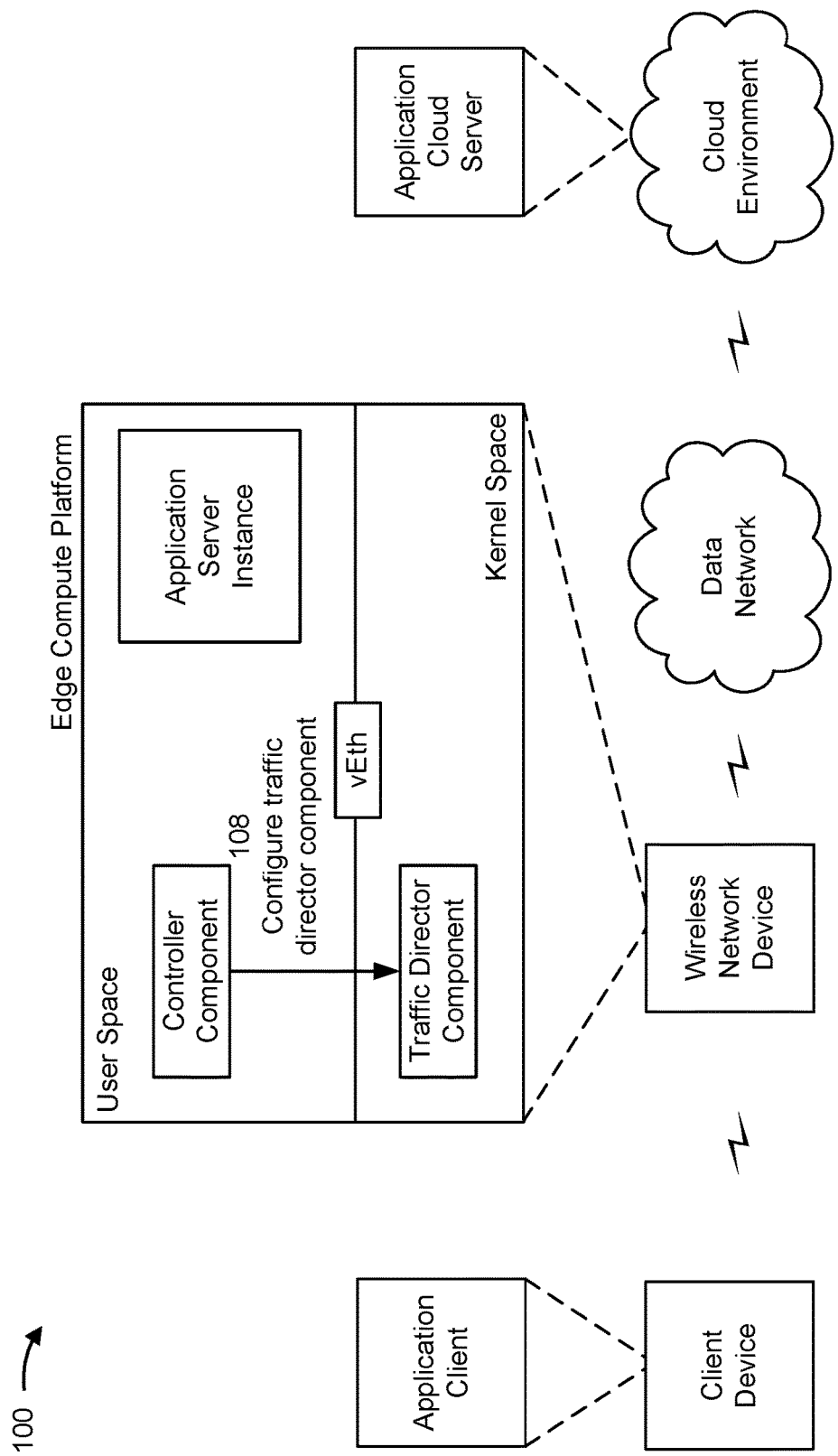

As shown in FIG. 1B, and by reference number 108, the traffic director component can be configured to redirect application data to the application server instance of the edge compute platform. In some implementations, the controller component can configure the traffic director component to redirect application data to the application server instance on the edge compute platform by providing a traffic rule to the traffic director component. The traffic rule can specify how data packets intended for the application cloud server are to be directed. For example, the traffic rule can specify that data packets intended for the application cloud server are to be redirected to the application server instance on the edge compute platform. As an example, the traffic rule can specify that data packets with header information including destination information corresponding to the application cloud server (e.g., an IP address associated with the application cloud server, a port associated with the application cloud server, and/or the like) are to be redirected to the application server instance on the edge compute platform (e.g., by specifying an IP address of the application server instance, a port of the application server instance, and/or the like). As another example, the traffic rule can specify that a threshold quantity of data packets intended for the application cloud server are to be redirected to the application server instance on the edge compute platform.

In some implementations, the controller component can provide the traffic rule to the traffic director component using a kernel extension such as Linux Traffic Control, Xtables, and/or the like. For example, the controller component can provide the traffic rule to the traffic director component in the form of an iptables TPROXY command.

Figure 1C:
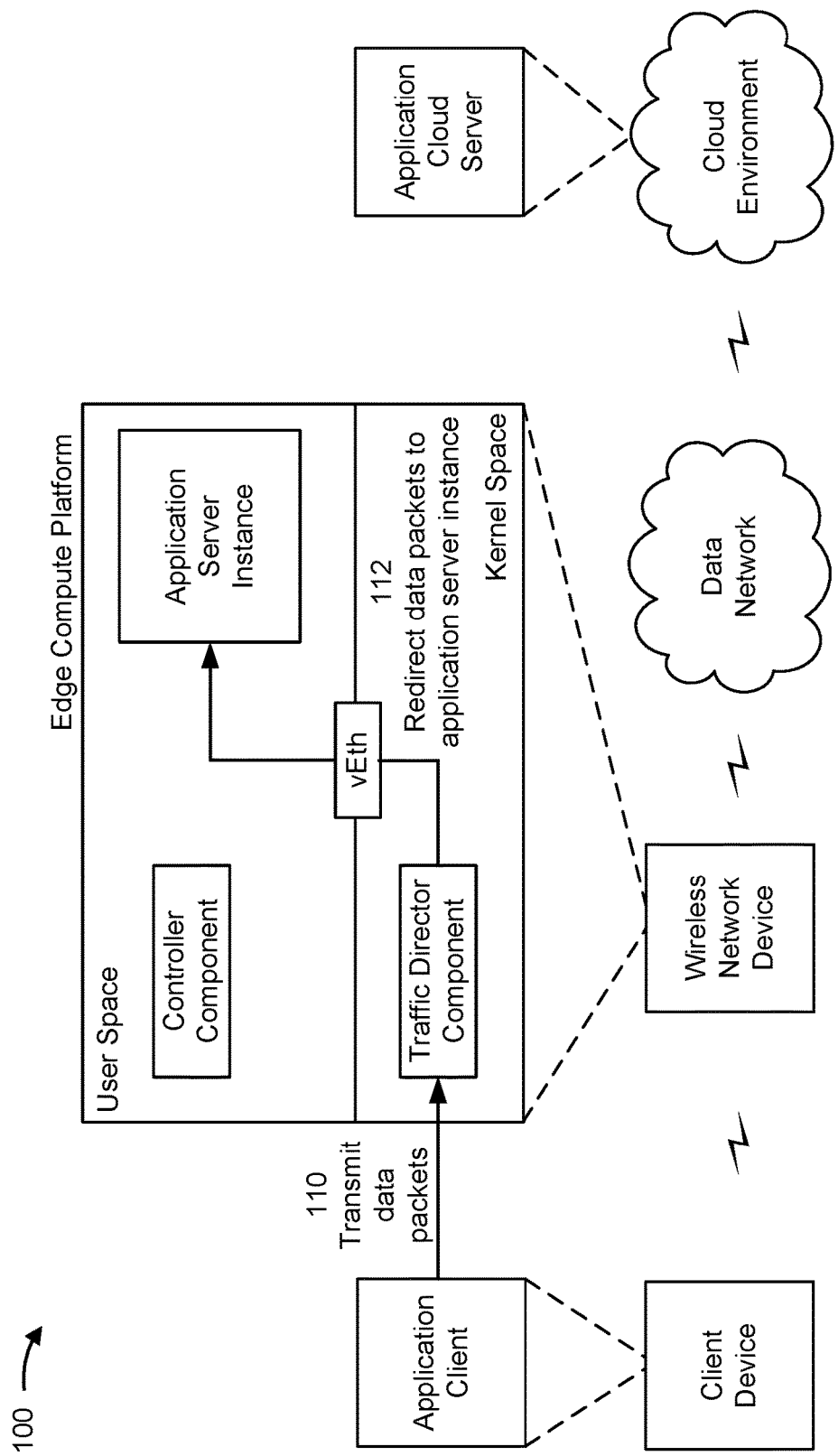

As shown in FIG. 1C, and by reference number 110, the user of the client device can use the application client on the client device. In this case, as the user uses the application client (or at some time after the user has interacted with the application client), the application can generate application data. For example, if the user is using a license plate recognition application client, the user can use the application client to capture a video stream or a video recording and, accordingly, the application client can generate application data representing the video stream or recording, as described above.

In some implementations, the application client (via the client device) can encode the application data into one or more data packets, assign the application cloud server as a destination for the one or more data packets, and transmit the one or more data packets toward the wireless network device. In some implementations, the wireless network device can receive, at the traffic director component in the kernel space, a data packet of the one or more data packets.

As further shown in FIG. 1C, and by reference number 112, the traffic director component can direct the data packet based on being configured with the traffic rule. For example, the traffic director component can analyze the data packet to determine whether the data packet is intended for the application cloud server (e.g., by identifying a destination IP address in a header of the data packet, identifying a destination port identifier in the header of the data packet, identifying an application identifier associated with the application cloud server, identify a flow identifier, and/or the like). Based on determining that the data packet is intended for the application cloud server, the traffic director component can identify the traffic rule associated with directing data packets intended for the application cloud server. The traffic director component can determine that the traffic rule specifies that data packets intended for the application cloud server are to be provided (i.e., redirected) to the application server instance on the edge compute platform. Accordingly, the traffic director component can provide the data packet to the application server instance on the edge compute platform based on the traffic rule. In some implementations, the traffic director component can provide the data packet to the application server instance via the virtual networking interface of the edge compute platform. Thereafter, the remaining data packets of the one or more data packets can be provided (i.e., redirected) to the application server instance in a similar fashion. In some implementations, a subset of the remaining data packets of the one or more data packets can be provided to the application server instance. For example, the traffic rule can specify that the traffic direction component is to provide 50% of the remaining data packets of the one or more data packets to the application server instance.

Figure 1D:
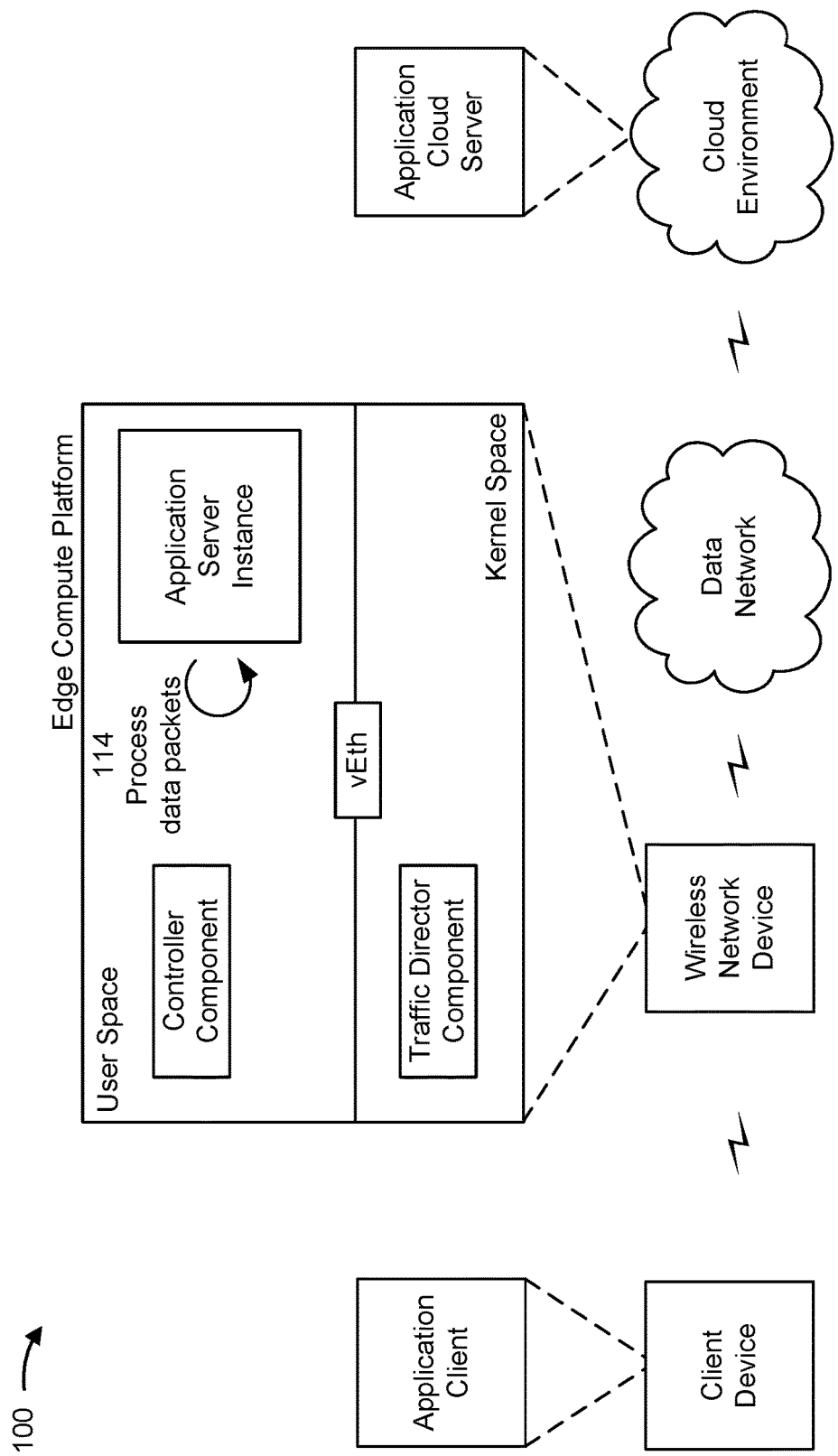

As shown in FIG. 1D, and by reference number 114, the application instance server can receive the one or more data packets and perform one or more operations, associated with the application cloud server, on the one or more data packets. The one or more operations can include performing the same or similar packet processing operations that the application cloud server is configured to perform, as described above. Returning to the license plate recognition example described above, the one or more data packets received at the application server instance can be the encoded application data (e.g., video stream or recording) generated by the license plate recognition application client. In this case, the application server instance can process the one or more data packets by decoding the one or more data packets into the original application data and applying one or more object recognition techniques (e.g., template matching, pattern recognition, a machine learning model trained on license plate data, and/or the like) to identify any license plate numbers in the application data.

Figure 1E:
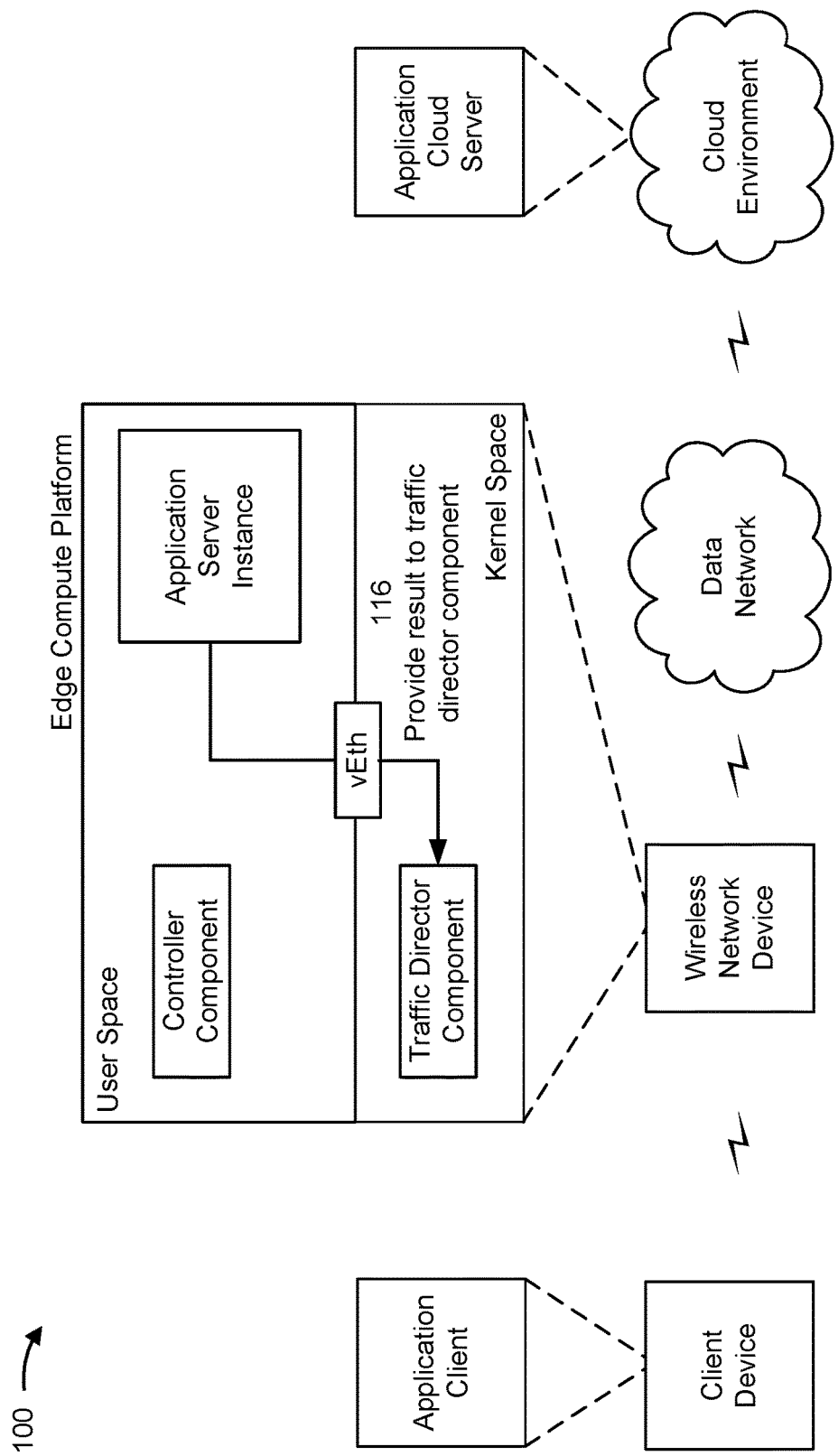

As shown in FIG. 1E, and by reference number 116, the application server instance can generate a result from performing the one or more operations and provide the result to the traffic director component through the virtual network interface. While a single result is shown in FIG. 1E, in practice, the application server instance can generate multiple results based on performing the one or more operations.

Figure 1F:
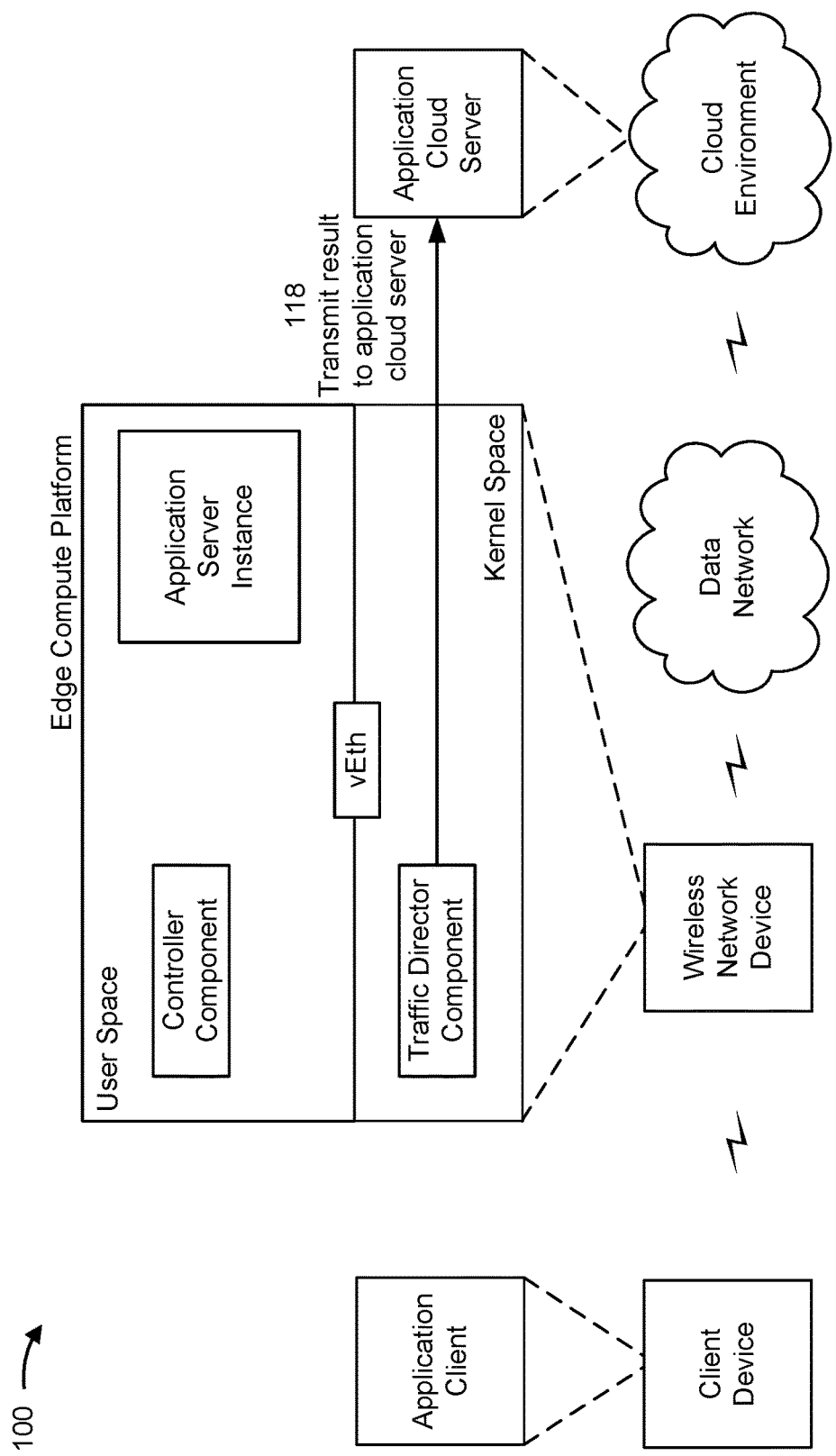

As shown in FIG. 1F, and by reference number 118, the traffic director component can receive the result from the application server instance via the virtual networking interface. In some implementations, the traffic director component can transmit the result to the application cloud server. For example, the traffic director component can transmit the output to the application cloud server via the data network, another wireless network device, and/or the like. For example, the application server instance on the wireless network device may perform the one or more first operations on the one or more data packets, provide the result of the one or more first operations to the traffic direction component, which can provide the result of the one or more first operations to a second wireless network device having a second application server instance thereon. The second server instance can perform one or more second operations on the result of the one or more first operations, provide the result of the one or more second operations to a third wireless network device, and so on.

To transmit the result, the traffic director component can encode the result into the form of one or more data packets such that the header information of the one or more data packets specifies the application cloud server as a destination of the one or more data packets (e.g., such that destination information in the header includes information associated with the application cloud server, such as an IP address, port, and/or the like). The traffic director component can transmit the result to the application cloud server by transmitting the one or more data packets to the application cloud server.

In some implementations, the application cloud server can receive the one or more data packets from the traffic director component. The application cloud server can perform one or more operations on the one or more data packets, such as decoding the one or more data packets, storing the result in a data store, performing additional processing on the result, transmitting the result to another location, and/or the like.

In this way, the edge compute platform can redirect application data intended for an application cloud server to an application server instance associated with the application cloud server so that the application data can be processed at or near the edge of the wireless communications network. In this way, the result of the processing can be transmitted through the data network communicatively connected to the wireless communications network instead of the application data, which decreases latency associated with the processing and decreases bandwidth usage in the wireless communications network, the data network, and/or the like.

Moreover, this allows for the processing of application data to be offloaded from a client device, which reduces battery and computational resource usage on the client device. In addition, the edge compute platform can redirect the application data without changing or reconfiguring the application client on the client device and/or the application cloud server, which simplifies deployment of mobile edge computing in the wireless communications network. Still further, this allows for the application data to be processed even when the client device does not have access to the data network.

As indicated above, FIGS. 1A-1F are provided merely as examples. Other examples are possible and can differ from what was described with regard to FIG. 1.

Figure 2:
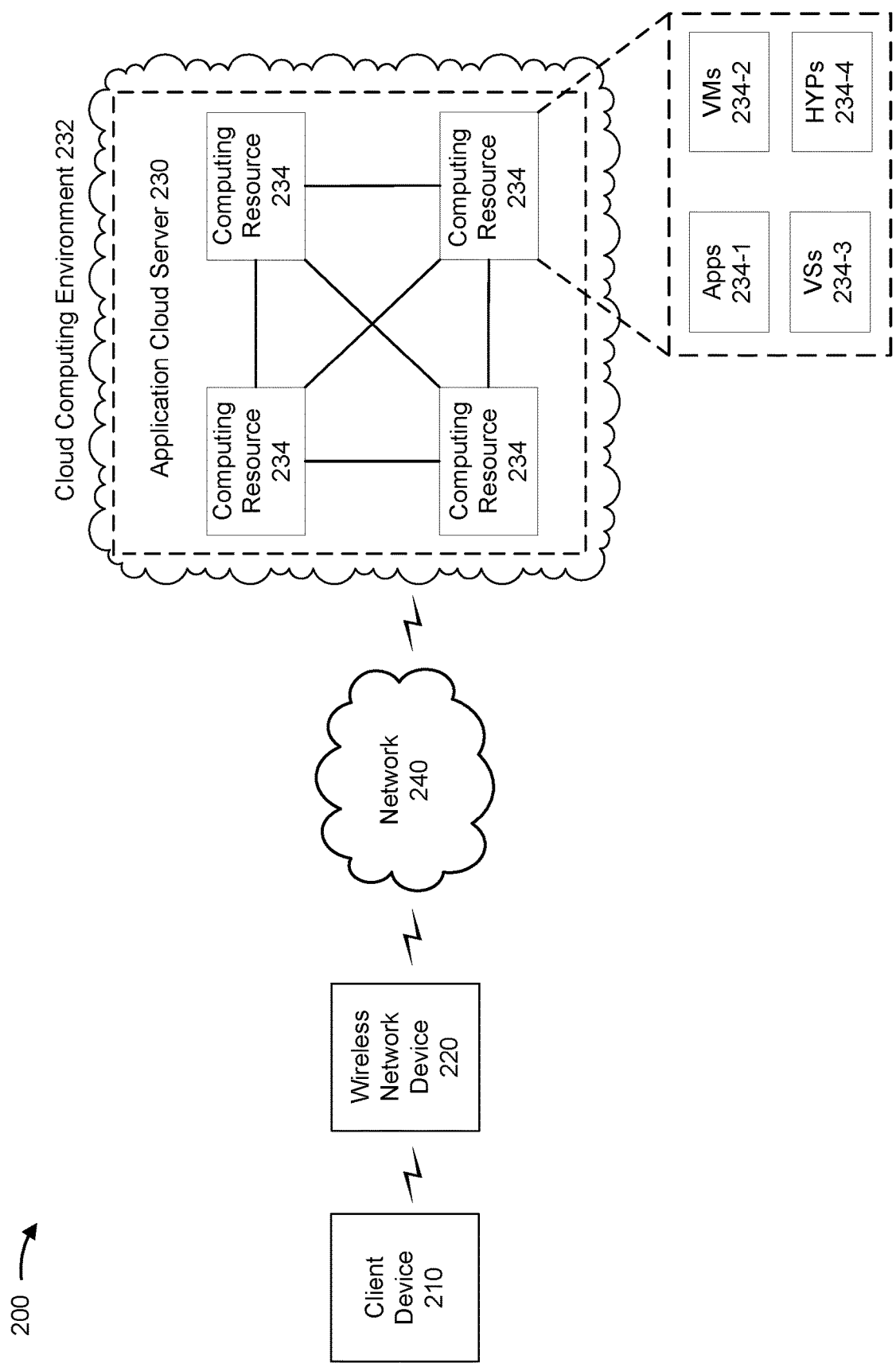
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a client device 210, a wireless network device 220, an application cloud server 230 in a cloud computing environment 232 that includes a set of computing resources 234, and a network 240. Devices of environment 200 can interconnect via wired connections, wireless connections, or a combination of wired and wireless connections.

Client device 210 includes one or more devices capable of communicating with wireless network device 220 and/or application cloud server 230 (e.g., via network 240). For example, client device 210 can include a wireless communications device, a radiotelephone, a personal communications system (PCS) terminal (e.g., that can combine a cellular radiotelephone with data processing and data communications capabilities), a smart phone, a laptop computer, a tablet computer, a personal gaming system, a UE, an IP camera, an IoT device, and/or a similar device. Client device 210 can be capable of communicating using uplink (e.g., client device to wireless network device) communications, downlink (e.g., wireless network device to client device) communications, and/or sidelink (e.g., client device-to-client device) communications. In some implementations, client device 210 can include a machine-type communication (MTC) client device, such as an evolved or enhanced MTC (eMTC) client device. In some implementations, client device 210 can include an Internet of Things (IoT) client device, such as a narrowband IoT (NB-IoT) client device and/or the like.

Wireless network device 220 includes one or more devices capable of communicating with client device 210. For example, wireless network device 220 can include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, a router, a gateway, a switch, a hub, a wireless access point, or a similar type of device. Wireless network device 220 can transfer traffic between client device 210 and network 240, between client device 210 and other wireless network devices 220, between wireless network devices 220, between another wireless network device 220 and network 240, and/or the like. Wireless network device 220 can provide one or more cells that cover geographic areas. Some wireless network devices 220 can be mobile base stations. Some wireless network devices 220 can be capable of communicating using multiple radio access technologies (RATs).

In some implementations wireless network device 220 can include an edge compute platform, which can process data received from client devices 210 and provide a result of the processing to application cloud server 230, and/or other locations, via network 240. In some implementations, environment 200 can include a plurality of wireless network devices 220 along a data path between client device 210 and application cloud server 230, and one or more of the plurality of wireless network devices 220 can include an edge compute platform.

In some implementations, wireless network device 220 can perform scheduling and/or resource management for client devices 210 covered by wireless network device 220 (e.g., client devices 210 covered by a cell provided by wireless network device 220). In some implementations, wireless network device 220 can be controlled or coordinated by a network controller, which can perform load balancing, network-level configuration, and/or the like. The network controller can communicate with wireless network device 220 via a wireless or wireline backhaul. In some implementations, wireless network device 220 can include a network controller, a self-organizing network (SON) module or component, or a similar module or component. In other words, a wireless network device 220 can perform network control, scheduling, and/or network management functions (e.g., for other wireless network device 220 and/or for uplink, downlink, and/or sidelink communications of client devices 210 covered by wireless network device 220). In some implementations, wireless network device 220 can include a central unit and multiple distributed units. The central unit can coordinate access control and communication with regard to the multiple distributed units. The multiple distributed units can provide client device 210 and/or other wireless network devices 220 with access to network 240.

Application cloud server 230 includes one or more devices capable of hosting an application server associated with an application client on client device 210. Application cloud server 230 can receive data from the application client on client device 210. For example, application cloud server 230 can receive raw application data (e.g., unprocessed application data) from the application client on client device 210. Additionally, application cloud server 230 can receive data from an edge compute platform on wireless network device 220. For example, application cloud server 230 can receive a result from the edge compute platform processing data received from the application client on client device 210.

In some implementations, as shown in FIG. 2, application cloud server 230 can be hosted in cloud computing environment 232. Notably, while implementations described herein describe application cloud server 230 as being hosted in cloud computing environment 232, in some implementations, application cloud server 230 might not be cloud-based (i.e., might be implemented outside of a cloud computing environment) or might be partially cloud-based.

Cloud computing environment 232 includes an environment that hosts application cloud server 230. Cloud computing environment 232 can provide computation, software, data access, storage, and/or other services. As shown, cloud computing environment 232 can include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 can host application cloud server 230. The cloud resources can include compute instances executing in computing resource 234, storage devices provided in computing resource 234, data transfer devices provided by computing resource 234, etc. In some implementations, computing resource 234 can communicate with other computing resources 234 via wired connections, wireless connections, or a combination of wired and wireless connections.

As further shown in FIG. 2, computing resource 234 can include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that can be provided to or accessed by one or more devices of environment 200. Application 234-1 can eliminate a need to install and execute the software applications on devices of environment 200. For example, application 234-1 can include software associated with application cloud server 230 and/or any other software capable of being provided via cloud computing environment 232. In some implementations, one application 234-1 can send/receive information to/from one or more other applications 234-1, via virtual machine 234-2. In some implementations, application 234-1 can include a software application associated with one or more databases and/or operating systems. For example, application 234-1 can include an enterprise application, a functional application, an analytics application, and/or the like.

Virtual machine 234-2 includes a software implementation of a machine (e.g., a computer) that executes programs like a physical machine. Virtual machine 234-2 can be either a system virtual machine or a process virtual machine, depending upon use and degree of correspondence to any real machine by virtual machine 234-2. A system virtual machine can provide a complete system platform that supports execution of a complete operating system ("OS"). A process virtual machine can execute a single program, and can support a single process. In some implementations, virtual machine 234-2 can execute on behalf of a user (e.g., a user of client device 210), and can manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 can present a virtual operating platform to the guest operating systems, and can manage the execution of the guest operating systems. Multiple instances of a variety of operating systems can share virtualized hardware resources.

Network 240 includes one or more wired and/or wireless networks. For example, network 240 can include a cellular network (e.g., a code division multiple access (CDMA) network, a 3G network, a 4G/LTE network, a 5G/NR network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
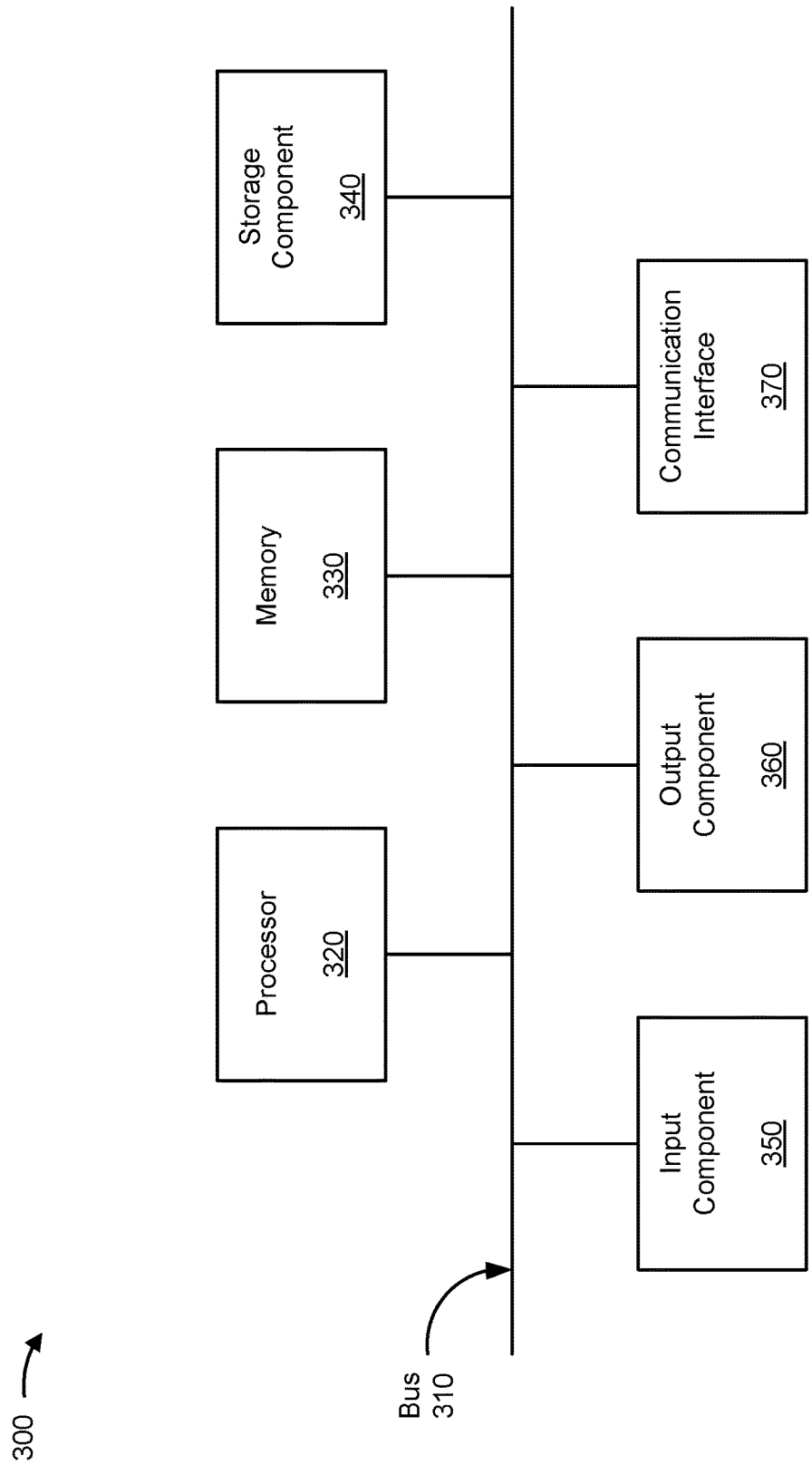
FIG. 3 is a diagram of example components of one or more devices of FIG. 2.

FIG. 3 is a diagram of example components of a device 300. Device 300 can correspond to client device 210, wireless network device 220, application cloud server 230, and/or computing resource 234. In some implementations, client device 210, wireless network device 220, application cloud server 230, and/or computing resource 234 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

FIG. 4 is a flow chart of an example process 400 for mobile edge computing. In some implementations, one or more process blocks of FIG. 4 can be performed by a wireless network device (e.g., wireless network device 220). In some implementations, one or more process blocks of FIG. 4 can be performed by another device or a group of devices separate from or including wireless network device 220, such as client device 210, application cloud server 230, and/or the like.

As shown in FIG. 4, process 400 can include receiving, at a traffic director in a kernel space included in the wireless network device, a data packet from a client device (block 410). For example, the wireless network device (e.g., using processor 320, memory 330, storage component 340, communication interface 370, and/or the like) can receive, at a traffic director in a kernel space included in the wireless network device, a data packet from a client device, as described above in connection with FIGS. 1A-1F.

As further shown in FIG. 4, process 400 can include determining whether the data packet is intended for an application cloud server operating in a cloud environment (block 420). For example, wireless network device 220 (e.g., using processor 320, memory 330, storage component 340, and/or the like) can determine whether the data packet is intended for an application cloud server operating in a cloud environment, as described above in connection with FIGS. 1A-1F. In some implementations, the application cloud server can be located remote from the wireless network device.

As further shown in FIG. 4, process 400 can include providing, based on determining that the data packet is intended for the application cloud server, the data packet to an application server instance executing on the wireless network device (block 430). For example, wireless network device 220 (e.g., using processor 320, memory 330, storage component 340, communication interface 370, and/or the like) can provide, based on determining that the data packet is intended for the application cloud server, the data packet to an application server instance executing on the wireless network device, as described above in connection with FIGS. 1A-1F. In some implementations, the application server instance can be configured to perform one or more operations associated with the application cloud server. In some implementations, the application server instance is implemented in a virtualized software container in a user space included in the wireless network device.

As further shown in FIG. 4, process 400 can include receiving, at the traffic director and from the application server instance, a result of the application server instance performing the one or more operations on the data packet (block 440). For example, wireless network device 220 (e.g., using processor 320, memory 330, storage component 340, communication interface 370, and/or the like) can receive, at the traffic director and from the application server instance, a result of the application server instance performing the one or more operations on the data packet, as described above in connection with FIGS. 1A-1F. In some implementations, the result is received via a virtual interface between the kernel space and the user space that permits communications between the kernel space and the user space.

As further shown in FIG. 4, process 400 can include transmitting the result to the application cloud server (block 450). For example, wireless network device 220 (e.g., using processor 320, memory 330, storage component 340, output component 360, communication interface 370, and/or the like) can transmit the result to the application cloud server, as described above in connection with FIGS. 1A-1F.

Process 400 can include additional implementations, such as any single implementation or any combination of implementations described below and/or described with regard to any other process described herein.

In some implementations, determining whether the data packet is intended for the application cloud server can include determining that the data packet is intended for the application cloud server based on destination information for the data packet. In some implementations, process 400 can include receiving a traffic rule and determining that the data packet is intended for the application cloud server based on the traffic rule.

In some implementations, the wireless network device can be at least one of a base station, a wireless hotspot, a router, a switch, a gateway, or a network bridge. In some implementations, the virtualized software container can be assigned a namespace. In some implementations, the wireless network device can be located at an edge of a wireless communications network or in a core network of the wireless communications network.

In some implementations, the wireless network device can include a plurality of application server instances, the application cloud server can include a plurality of application cloud servers, and each of the plurality of application server instances can be associated with one of the plurality of application cloud servers.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

A conjunction used with regard to two or more alternatives (e.g., "or" or "and/or") is intended to be interpreted as inclusive (e.g., "and/or") rather than exclusive with regard to the two or more alternatives, irrespective of which form of the conjunction is predominately used herein, unless language to override this interpretation is used (e.g., "only one of," etc.).

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A wireless network device, comprising:
one or more memories; and
one or more processors, coupled to the one or more memories, to:
receive, at a traffic director in a kernel space included in the wireless network device, a data packet from a client device,
wherein the wireless network device is at least one of a base station or a wireless hotspot;
determine whether the data packet is intended for an application cloud server operating in a cloud environment,
wherein the application cloud server is located remote from the wireless network device;
provide, based on determining that the data packet is intended for the application cloud server, the data packet to an application server instance executing on the wireless network device,
wherein the application server instance is one of a plurality of application server instances of the wireless network device,
wherein the wireless network device includes a plurality of application server instances,
wherein a plurality of application cloud servers include the application cloud server,
wherein each of the plurality of application server instances is associated with one of the plurality of application cloud servers,
wherein the application server instance is implemented in a virtualized software container in a user space included in an operating system of the wireless network device,
wherein the virtualized software container is assigned a namespace, and
wherein the application server instance is a copy of the application cloud server, and is configured to host an application and perform one or more operations associated with the application cloud server;
receive, at the traffic director and from the application server instance, a result of the application server instance performing the one or more operations on the data packet,
wherein the result is received via a virtual interface between the kernel space and the user space that permits communications between the kernel space and the user space; and
transmit the result to the application cloud server.

2. The wireless network device of claim 1, wherein the one or more processors, when determining whether the data packet is intended for the application cloud server, are to:

determine that the data packet is intended for the application cloud server based on destination information for the data packet.

3. The wireless network device of claim 1, wherein the one or more processors further are to:
receive a traffic rule; and
wherein the one or more processors, when determining whether the data packet is intended for the application cloud server, are to:
determine that the data packet is intended for the application cloud server based on the traffic rule.

4. The wireless network device of claim 1, wherein the wireless network device is at least one of a router, a switch, a gateway, or a network bridge.

5. The wireless network device of claim 1, wherein the wireless network device is located at an edge of a wireless communications network or in a core network of the wireless communications network.

6. A method, comprising:
receiving, at a traffic director in a kernel space included in a wireless network device, a data packet from a client device,
wherein the wireless network device is at least one of a base station or a wireless hotspot;
determining, by the wireless network device, whether the data packet is intended for an application cloud server operating in a cloud environment,
wherein the application cloud server is located remote from the wireless network device;
providing, by the wireless network device and based on determining that the data packet is intended for the application cloud server, the data packet to an application server instance executing on the wireless network device,
wherein the application server instance is one of a plurality of application server instances of the wireless network device,
wherein the wireless network device includes a plurality of application server instances,
wherein a plurality of application cloud servers include the application cloud server,
wherein each of the plurality of application server instances is associated with one of the plurality of application cloud servers,
wherein the application server instance is implemented in a virtualized software container in a user space included in an operating system of the wireless network device,
wherein the virtualized software container is assigned a namespace, and
wherein the application server instance is a copy of the application cloud server, and is configured to host an application and perform one or more operations associated with the application cloud server;
receiving, at the traffic director and from the application server instance, a result of the application server instance performing the one or more operations on the data packet,
wherein the result is received via a virtual interface between the kernel space and the user space that permits communications between the kernel space and the user space; and
transmitting, by the wireless network device, the result to the application cloud server.

7. The method of claim 6, wherein determining whether the data packet is intended for the application cloud server comprises:
determining that the data packet is intended for the application cloud server based on destination information for the data packet.

8. The method of claim 6, further comprising:
receiving a traffic rule; and
wherein determining whether the data packet is intended for the application cloud server comprises:
determining that the data packet is intended for the application cloud server based on the traffic rule.

9. The method of claim 6, wherein the wireless network device is at least one of a router, a switch, a gateway, or a network bridge.

10. The method of claim 6, wherein the wireless network device is located at an edge of a wireless communications network or in a core network of the wireless communications network.

11. A non-transitory computer-readable medium storing instructions, the instructions comprising:
one or more instructions that, when executed by one or more processors in a wireless network device, cause the one or more processors to:
receive, at a traffic director in a kernel space included in the wireless network device, a data packet from a client device,
wherein the wireless network device is at least one of a base station or a wireless hotspot;
determine whether the data packet is intended for an application cloud server operating in a cloud environment,
wherein the application cloud server is located remote from the wireless network device;
provide, based on determining that the data packet is intended for the application cloud server, the data packet to an application server instance executing on the wireless network device,
wherein the application server instance is one of a plurality of application server instances of the wireless network device,
wherein the wireless network device includes a plurality of application server instances,
wherein a plurality of application cloud servers include the application cloud server,
wherein each of the plurality of application server instances is associated with one of the plurality of application cloud servers,
wherein the application server instance is implemented in a virtualized software container in a user space included in an operating system of the wireless network device,
wherein the virtualized software container is assigned a namespace, and
wherein the application server instance is a copy of the application cloud server and is configured to host an application and perform one or more operations associated with the application cloud server;
receive, at the traffic director and from the application server instance, a result of the application server instance performing the one or more operations on the data packet,
wherein the result is received via a virtual interface between the kernel space and the user space that permits communications between the kernel space and the user space; and
transmit the result to the application cloud server.

12. The non-transitory computer-readable medium of claim 11, wherein the one or more instructions, that cause the one or more processors to determine whether the data packet is intended for the application cloud server, cause the one or more processors to:
  determine that the data packet is intended for the application cloud server based on destination information for the data packet.

13. The non-transitory computer-readable medium of claim 11, wherein the one or more instructions, when executed by the one or more processors, further cause the one or more processors to:
  receive a traffic rule; and
  wherein the one or more instructions, that cause the one or more processors to determine whether the data packet is intended for the application cloud server, cause the one or more processors to:
    determine that the data packet is intended for the application cloud server based on the traffic rule.

14. The non-transitory computer-readable medium of claim 11, wherein the wireless network device is at least one of a router, a switch, a gateway, or a network bridge.

15. The non-transitory computer-readable medium of claim 11, wherein the wireless network device is located at an edge of a wireless communications network or in a core network of the wireless communications network.

16. The wireless network device of claim 1, wherein the traffic director includes a traffic control kernel extension.

17. The wireless network device of claim 1, wherein the one or more processors, when determining whether the data packet is intended for the application cloud server, are to:
  determine that the data packet is intended for the application cloud server based on a destination internet protocol (IP) address in a header of the data packet and/or a destination port in the header of the data packet.

18. The method of claim 6, wherein the traffic director includes a traffic control kernel extension.

19. The method of claim 6, wherein determining whether the data packet is intended for the application cloud server, comprises:
  determining that the data packet is intended for the application cloud server based on a destination internet protocol (IP) address in a header of the data packet and/or a destination port in the header of the data packet.

20. The non-transitory computer-readable medium of claim 11, wherein the traffic director includes a traffic control kernel extension.

* * * * *